United States Patent [19]

Hartley et al.

[11] Patent Number: 5,284,710
[45] Date of Patent: Feb. 8, 1994

[54] FLUOROPOLYMER-ACRYLIC PLASTIC COMPOSITE AND COEXTRUSION METHOD

[75] Inventors: Jeffrey W. Hartley, Lancaster; Arthur F. Korney, Jr., Pickerington; Earl H. Sexton, III, Columbus, all of Ohio

[73] Assignee: Crane Plastics Company, Columbus, Ohio

[21] Appl. No.: 761,277

[22] Filed: Sep. 17, 1991

[51] Int. Cl.⁵ .............................................. B32B 27/00
[52] U.S. Cl. ................................... 428/421; 428/522; 428/511; 428/463
[58] Field of Search ............... 428/421, 518, 522, 463, 428/511

[56] References Cited

U.S. PATENT DOCUMENTS

| | | | |
|---|---|---|---|
| 3,253,060 | 5/1966 | Koblitz et al. | 260/900 |
| 3,458,391 | 7/1969 | Miller | 161/189 |
| 3,524,906 | 8/1970 | Schmitt et al. | 260/900 |
| 3,769,371 | 10/1973 | Nersasian | 260/900 |
| 3,779,976 | 12/1973 | Marsico et al. | 260/32.8 R |
| 3,895,029 | 7/1975 | Ward | 260/31.4 R |
| 3,944,689 | 3/1976 | Luckock et al. | 427/385 |
| 4,123,401 | 10/1978 | Berghmans et al. | 260/29.6 F |
| 4,166,081 | 8/1979 | Fournier, Jr. et al. | 525/75 |
| 4,169,180 | 9/1979 | McDonaugh | 428/215 |
| 4,183,777 | 1/1980 | Summers et al. | 156/243 |
| 4,221,757 | 9/1980 | Strassel | 264/171 |
| 4,226,904 | 10/1980 | Olliver et al. | 428/212 |
| 4,229,549 | 10/1980 | Usami et al. | 525/76 |
| 4,281,492 | 8/1981 | Schock et al. | 52/309.9 |
| 4,291,099 | 9/1981 | Strassel | 428/421 |
| 4,364,886 | 12/1982 | Strassel | 264/171 |
| 4,404,247 | 9/1983 | Dominguez-Burguette et al. | 428/213 |
| 4,415,519 | 11/1983 | Strassel | 264/171 |
| 4,424,292 | 1/1984 | Ravinovitch et al. | 524/88 |
| 4,511,695 | 4/1985 | Lindner et al. | 525/83 |
| 4,557,977 | 12/1985 | Memmer et al. | 428/421 |
| 4,581,412 | 4/1986 | Ohmori et al. | 525/199 |
| 4,585,701 | 4/1986 | Baroszeck et al. | 428/421 |
| 4,728,677 | 3/1988 | Lacatus et al. | 523/135 |
| 4,776,913 | 10/1988 | Goossens et al. | 156/230 |
| 4,824,911 | 4/1989 | Chu | 525/199 |
| 4,877,839 | 10/1989 | Conti-Ramsden et al. | 525/200 |
| 4,927,675 | 5/1990 | Adams et al. | 428/35.9 |
| 5,132,164 | 7/1992 | Moriya et al. | 428/421 |

FOREIGN PATENT DOCUMENTS

91308401.8 9/1991 European Pat. Off. .

*Primary Examiner*—Edith Buffalow
*Attorney, Agent, or Firm*—Roger A. Gilcrest

[57] ABSTRACT

The present invention relates to an extruded fluoropolymer-acrylic composite and a method of producing same. The extruded product of the present invention comprises a layer of at least one first polymeric substance comprising a mixture of: (1) from about 1 to about 70 percent by weight of at least one acrylic material, (2) at least one fluoropolymer, and (3) at least one inorganic pigment in sufficient amount to render the first polymeric substance reflective to infrared light and opaque to both ultraviolet light and light and light having a wavelength of about 350 to about 2500 nanometers; in contact with a layer of at least one second polymeric substance being of a chemical character so as to be amenable to adhesion to the at least one first polymeric substance in the extrusion product. The preferred embodiment of the invention method is conducted under vacuum.

10 Claims, No Drawings

FLUOROPOLYMER-ACRYLIC PLASTIC COMPOSITE AND COEXTRUSION METHOD

BACKGROUND

The present invention relates to an fluoropolymer-acrylic plastic composites and a coextrusion for producing them.

Plastic composites have a wide variety of applications, particularly in the building and automotive fields. These composites can find use in seals, liners and gaskets for doors, windows and building or assembly sections. In these uses, it is important that the particular composite have and maintain the appropriate characteristics (hardness, strength, flexibility, expansion, and dimensional characteristics).

Such applications usually involve outdoor use or other exposure to environments which accelerate polymer degradation. Polymer degradation can cause loss in color, stability, flexibility and/or strength. Sunlight or other light sources can breakdown polymers as can exposure to water- or air-borne caustic materials, such as acids, salts, and organic solvents. Accordingly, it is desirable to be able to produce plastic composites that will have the desired strength, flexibility, expansion and dimensional stability characteristics, while being resistant to the degrading aspects of its application environment.

The development of fluoropolymers greatly increased the resistance to degradation for polymers containing them. Examples of such fluoropolymers are found in U.S. Pat. Nos. 3,253,060 to Koblitz et al., 3,458,391 to Miller, 3,523,906 to Schmitt et al., 3,769,371 to Nersasian, 3,779,976 to De Marisco et al., 3,895,029 to Ward, 3,944,689 to Luckock et al., 4,123,401 to Berghmans et al., 4,221,757 to Strassel, 4,226,904 to Ollivier et al., 4,281,492 to Schock et al., 4,291,099 to Strassel, 4,364,886 to Strassel, 4,404,247 to Dominguez-Burguette et al., 4,415,519 to Strassel, 4,424,292 to Rabinovitch, 4,557,977 to Memmer et al., 4,581,412 to Ohmori et al., 4,585,701 to Bartoszek et al., 4,728,677 to Lacatus et al., 4,776,913 to Goossens et al., 4,824,911 to Chu, 4,877,839 to Conti-Ramsden et al., 4,927,675 to Adams et al., all of which are hereby incorporated herein by reference. However, fluoropolymers are relatively expensive when compared to non-fluoropolymers such as acrylic polymers and polyvinylchlorides. Thus it is desirable to produce a polymer composite which will yield the advantages of fluoropolymers while minimizing the total fluoropolymer content so that a polymeric material can be made cost effective for a wide variety of uses, particularly in the areas described above.

Other advantages and benefits of the present invention will be apparent to one of ordinary skill in light of the present disclosure and the practice of the invention.

SUMMARY OF THE INVENTION

In accordance with the objectives described above, the present invention relates to a fluoropolymer-acrylic composite and a method of producing same by coextrusion.

The plastic composite of the present invention, in its most general form, comprises an extrusion product of two layers as follows: a layer of at least one first polymeric substance comprising a mixture of (1) from about 30 to about 70 percent by weight of at least one acrylic material, (2) from about 30 to about 70 percent of at least one fluoropolymer, and (3) at least one inorganic pigment in sufficient amount to render the first polymeric substance reflective to infrared light and opaque to both ultraviolet light and light having a wavelength of about 350 to about 2500 nanometers; with this layer of at least one polymeric substance being in contact with a layer of at least one second polymeric substance being of a chemical character so as to be amenable to adhesion to the first polymeric substance in the extrusion product.

As used herein, the term "polymeric substance" refers to any polymeric substance such as any polymer; and the term "polymer" shall be understood as further including co-polymers, mixed co-polymers, block co-polymers, etc.

The first polymeric substance preferably comprises from about 30 to about 70 percent, and most preferably from about 30 to about 40 percent by weight of at least one acrylic material and from about 30 to about 70 percent by weight, and most preferably from about 60 to about 70 percent by weight of at least one fluoropolymer. Typical of the acrylic materials suitable for application in the present invention are the methacrylates, such as methylmethacrylates and ethylmethacrylates. An example of the fluoropolymers that may be used in the present invention is polyvinylidene fluoride.

The second polymeric substance may be any polymeric substance amenable to adhesion to the first polymeric substance described above in an extrusion product. Because fluoropolymers generally do not adhere to polymers usually used for the second polymeric substance of the present invention, the second polymeric substance is selected to be amenable to adhesion to the acrylic portion of the first polymeric substance. Thus the acrylic portion acts as an intermediary between the fluoropolymer and the second polymeric substance in the extrusion product. Examples of such second polymeric substances applicable in the present invention include polyvinylchlorides, chloropolyvinylchlorides and other polymeric materials. Other second polymeric substances may include intermediary binding coatings, such as acrylic coatings, which can be placed on a suitable substrate material such as metal, wood or pultrusion materials.

The inorganic pigment(s) used in the present invention may be any appropriate pigment that can be incorporated into the first polymeric substance, and may be selected for the particular performance and color results. Several of these pigments are well known in the art. Examples include commercially available pigments such as Shepherd Blue #3, Shepherd Green #151, Drakenfeld Brown #10363, Drakenfeld Yellow #10401, Englehard Blue #7540 and Englehard Yellow #7730. The preferred range of the total pigment concentration used in the present invention is greater than about three percent by weight of the first polymeric substance for normal thicknesses of the first polymeric substance used in building applications.

With respect to the use of polyvinylchlorides as the second polymeric substance, it is preferred that the first at least one polymeric substance comprises about 40 to about 50 percent by weight of at least one acrylic material, and about 50 to about 60 percent by weight of at least one fluoropolymer.

With respect to the use of chloropolyvinylchlorides as the second polymeric substance, it is preferred that the first at least one polymeric substance comprises about 30 percent by weight of at least one acrylic material, and about 70 percent by weight of at least one fluoropolymer.

The present invention also includes a method of producing a fluoropolymer-acrylic composite.

The method of the present invention generally involves coextruding a first and a second polymeric substance so as to form an extrusion product, the first polymeric substance comprising: (a) from about 30 to about 70 percent by weight of at least one acrylic material, (b) from about 30 to about 70 percent of at least one fluoropolymer, and (c) at least one inorganic pigment in sufficient amount to render the first polymeric substance reflective to infrared and opaque to both ultraviolet light and light having a wavelength in the range of from about 350 to about 2500 nanometers; and a second polymeric substance being of a chemical character so as to be amenable to adhesion to the first polymeric substance in the resulting extrusion product.

It is preferred that the coextrusion process be carried out under vacuum. This is done to remove contaminants such as water vapor, volatile solvents and unreacted polymer components, which can adversely affect adhesion between the polymeric substances during manufacture, yielding a product of unsatisfactory quality.

The invention is not limited to any number of total layers in a plastic composite in accordance with the present invention, nor is the invention limited to any range of size or thickness of such layers.

DETAILED DESCRIPTION OF THE PREFERRED EMBODIMENT

In accordance with the foregoing disclosure, the following is a description of a preferred embodiment of the invention which is considered to be the best mode of the present invention where the plastic composite is to be used in outdoor applications such as in glass sealing gaskets for prefabricated building windows.

A first polymeric substance comprising about 50 percent by weight methylmethacrylate, about 50 percent by weight polyvinylidene fluoride and a sufficient amount of Shepherd Blue #3 to insure opacity of the upper ("capstock") layer is placed into an extruder, such as a 1.5" DS-15 extruder, commercially available from Davis Standard. Also placed in a second extruder is a second polymeric substance, Crane Plastics R112-133, which can be generically described as an extrudable, rigid PVC compound. The first and second polymeric substances are preferably coextruded under a vacuum sufficient to remove volatiles from the extruding product (i.e. approximately 26 to 30" Hg).

The components of the first polymeric substance can be processed, for instance, in either of the two following ways:

1. Predetermined proportions of each ingredient (e.g. 40 to 70% by weight fluoropolymer and 30 to 60% by weight acrylic and at least one inorganic pigment in sufficient amount to render the composite opaque to both ultraviolet and 350-2500 nanometer light) can be tumbled together in a drum so as to bring about a sufficiently homogeneous mixture to distribute said components. This mixture can then be added directly to the extrusion hopper and processed (with the second polymeric substance) into a coextruded product of any desired profile.

2. The components of the first polymeric substance as outlined in 1 above can be preprocessed, such as by extruding them on a vented twin screw extruder into a substantially homogeneous melt which is then ground, sliced or diced into a pellet form of the uniformly dispersed extrudate pellets. This pellet form can then be coextruded with the second polymeric substance in the same manner as the mixture described in 1 above.

In the extrusion process, either of the mixtures from 1 or 2 above is preferably predried at about 180 degrees F. in a desiccant drier for about four hours. The processing is then carried out using a "side extruder" (i.e. a smaller, non-vented single screw extruder) which is set up to deliver a molten flow of the first polymeric substance into a die where it is uniformly applied as a skin over a molten second polymeric substance which is usually (but not limited to) polyvinylchloride or chloropolyvinylchloride. The second polymeric substance is simultaneously being processed by a vented, twin-screw extruder.

In the preferred embodiment of the invention, the individual components may be drum tumbled together, predried and added to an extruder throat. This improvement allows extrusion to be carried out with no apparent deleterious effect on the performance of the finished product.

The resulting molten coextruded shape is then both formed into the desired shape or configuration and cooled, according to any of several methods known in the art. The extrusion product may also be shaped or cut for the desired application after the extrudate has cooled.

In light of the foregoing disclosure, it will be obvious to make alterations, variations and modifications to the present invention such as by the substitution of equivalent materials, arrangements and process steps, without departing from its spirit.

What is claimed is:

1. A plastic composite comprising:
   a) an outermost layer of at least one first polymeric substance comprising:
      1) from about 30 to about 70 percent by weight of at least one acrylic material,
      2) from about 30 to about 70 percent by weight of at least one fluoropolymer, and
      3) at least one inorganic pigment in sufficient amount to render said first polymeric substance reflective to infrared light and opaque to light having a wavelength of about 350 to about 2500 nanometers; said outermost layer in contact with:
   b) a layer of at least one second polymeric substance being of a chemical character so as to adhere to said at least one first polymeric substance in said extrusion product, said at least one second polymeric substance comprising a polymeric substance selected from the group consisting of polyvinylchlorides, chloropolyvinylchlorides, and other polymers which adhere to said first polymeric substance only through adhesion to said at least one acrylic material.

2. A plastic composite according to claim 1 wherein said layer of at least one first polymeric substance comprises from about 30 to about 40 percent by weight of at least one acrylic material and from about 60 to about 70 percent by weight of said at least one fluoropolymer.

3. A plastic composite according to claim 1 wherein said at least one inorganic pigment is present in an amount of at least about 3 percent by weight of said first polymeric substance.

4. A plastic composite according to claim 1 wherein said acrylic material is selected from the group consisting of methacrylates.

5. A plastic composite according to claim 1 wherein said fluoropolymer is polyvinylidene fluoride.

6. A plastic composite according to claim 1 wherein said at least one first polymeric substance comprises from about 40 to about 50 percent by weight of said at least one acrylic material, and about from about 50 to about 60 percent by weight of said at least one fluoropolymer, and wherein said second polymeric substance comprises at least one polyvinylchloride.

7. A plastic composite according to claim 1 wherein said at least one first polymeric substance comprises about 30 percent by weight of said at least one acrylic material, and about 70 percent by weight of said at least one fluoropolymer, and said second polymeric substance comprises at least one chloropolyvinylchloride.

8. A plastic composite according to claim 1 wherein said polymeric substance is a polymeric coating, wherein said polymeric coating is placed on a substrate material.

9. A plastic composite according to claim 8 wherein said polymeric coating is selecting from the group consisting of acrylic coatings.

10. A plastic composite according to claim 8 wherein said substrate material is selected from the group consisting of wood, metal and pultrusion materials.

* * * * *

UNITED STATES PATENT AND TRADEMARK OFFICE
CERTIFICATE OF CORRECTION

PATENT NO. : 5,284,710
DATED : February 8, 1994
INVENTOR(S) : Jeffrey W. Hartley et al It is certified that error appears in the above-indentified patent and that said Letters Patent is hereby corrected as shown below:

In the Abstract, line 5, "1" should read --30--.

Column 1, line 8, after "coextrusion", Insert --method--.

Column 4, line 36, after "comprising", Insert --an extrusion product having at least two layers comprising--.

Column 4, line 38, after "comprising", Insert --a mixture of--.

Signed and Sealed this

Twenty-sixth Day of July, 1994

Attest:

BRUCE LEHMAN

*Attesting Officer*   *Commissioner of Patents and Trademarks*